Jan. 14, 1930. O. REYNOLDS 1,743,801
SIESTA EYESHADE
Filed July 5, 1928
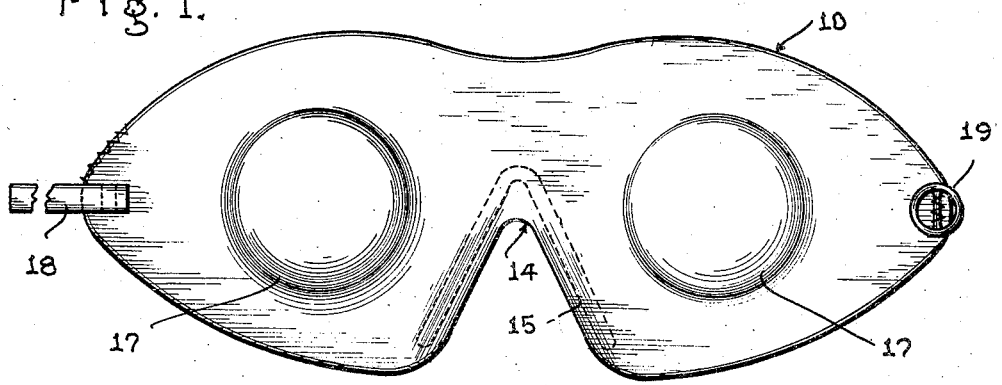
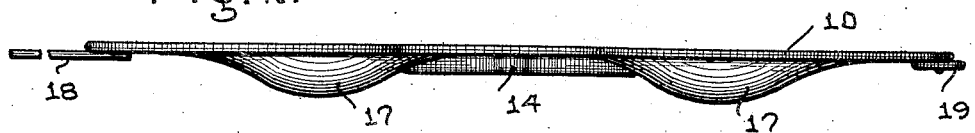
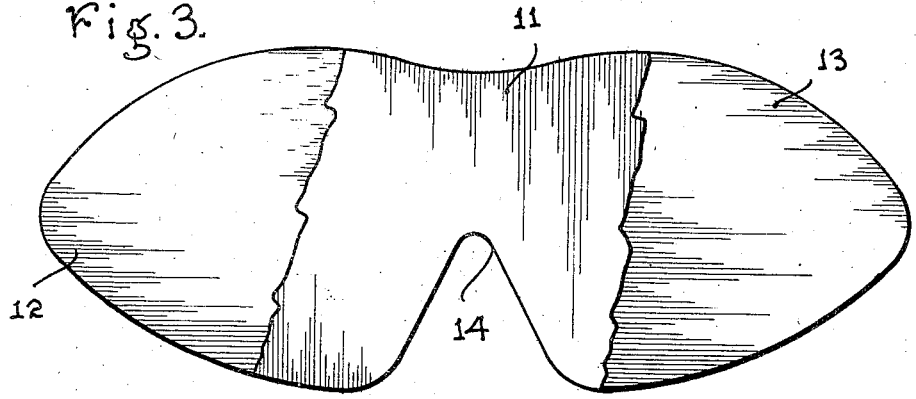
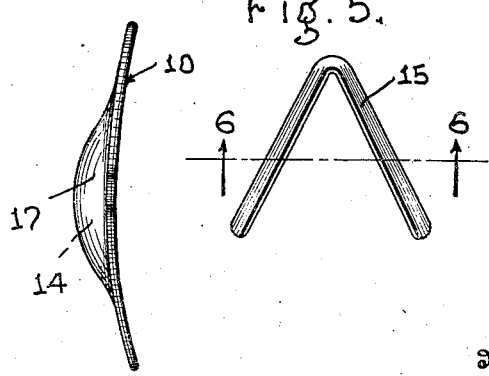
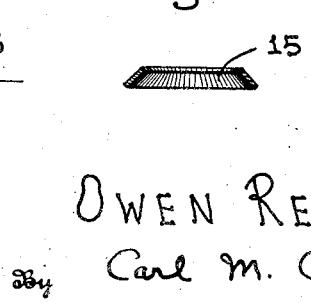
Inventor
OWEN REYNOLDS,
By Carl M. Cohen
Attorney Patented Jan. 14, 1930

1,743,801

UNITED STATES PATENT OFFICE

OWEN REYNOLDS, OF LONG ISLAND CITY, NEW YORK

SIESTA EYESHADE

Application filed July 5, 1928. Serial No. 290,583.

This invention relates to eye shields for protecting the eyes from light and has for its main object the provision of an eye shield made of opaque material to prevent the passage of light therethrough and comprising a sheet of inherently form-sustaining material having an intermediate portion adapted to fit the nose of the wearer and having side portions to cover the eyes.

Another object of the invention is the provision of an eye shield of the type described having the side portions thereof which cover the eyes of concavo-convex form to provide recesses in front of the eyes whereby the shade does not interfere with the movement of the eyes, eye lashes or eye lids.

A further object of the invention is to provide an eye shield made of a plurality of layers of flexible material, comprising covering layers and a layer of relatively stiff material whereby to cause the shade formed by these layers of material to be inherently form-sustaining thereby obviating the necessity for a frame.

A still further object of the invention is the provision of a nose piece for supporting the eye shield in position, the nose piece being formed preferably of soft metal which may be bent and adjusted to the nose and preferably covered by the material of the shield.

A further object of the invention is generally to improve the construction of eye shields.

Referring to the drawings forming a part of this specification:

Fig. 1 is a front view of the eye shield embodying the present invention;

Fig. 2 is a top edge view of the eye shield;

Fig. 3 is a plane view of the multiply sheet from which the eye shield is formed;

Fig. 4 is a side edge view of the shield;

Fig. 5 is a detail view of the nose piece, and;

Fig. 6 is a section on the line 6—6 of Fig. 5.

The eye shield 10 in Fig. 1 is formed from a multiply sheet of material illustrated in Fig. 3. This multiply sheet of material comprises an inner stiffening layer 11 which may be of cardboard or similar material having both sides covered by layers of material 12 and 13 which may be of silk or other suitable material. The intermediate portion of the multiply sheet is cut out as indicated at 14 to fit over the nose of the wearer. A nose piece 15, preferably of soft metal, is positioned about the recess 14 and is secured in place between two layers of the multiply sheet whereby these layers serve to hold the nose piece in position and also cover the latter.

The side portions of the eye shield are of concavo-convex form whereby to provide recesses 17 in the inner side of the eye shield to permit free movement of the eyes, eye lashes or eye lids.

An elastic strap 18 and a buckle 19 are provided for fastening the eye shield in position about the head.

The eye shield thus comprises a multiply sheet of material which is inherently form-sustaining and form-retaining so that the recesses formed therein are permanently retained, the nose piece being of soft metal can be bent and adjusted to some extent to fit the nose of the wearer.

Having thus described the invention and which is claimed and desired to be secured by Letters Patent is:

An eye shield having an opaque shade portion comprising a plurality of continuous layers of material, one of said layers being of relatively stiff material whereby said shade is inherently form-sustaining, said shade portion having an intermediate portion conforming to the bridge of the nose of the wearer and side portions of concavo-convex form providing pockets in front of the eyes of the wearer, and a flexible metal nose piece lying between said layers of material and covered thereby.

OWEN REYNOLDS.